(12) United States Patent
Duan

(10) Patent No.: US 10,624,015 B2
(45) Date of Patent: Apr. 14, 2020

(54) TIMING ADVANCE ASSISTED MEASUREMENT REPORT FOR IMPROVED HANDOVER PERFORMANCE

(71) Applicant: QUALCOMM Incorporated, San Diego, CA (US)

(72) Inventor: Long Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 15/937,504

(22) Filed: Mar. 27, 2018

(65) Prior Publication Data

US 2019/0306775 A1    Oct. 3, 2019

(51) Int. Cl.
| | | |
|---|---|---|
| *H04W 36/34* | (2009.01) | |
| *H04W 56/00* | (2009.01) | |
| *H04W 36/00* | (2009.01) | |
| *H04L 5/00* | (2006.01) | |

(52) U.S. Cl.
CPC .......... *H04W 36/34* (2013.01); *H04L 5/0051* (2013.01); *H04W 36/0077* (2013.01); *H04W 56/0045* (2013.01); *H04W 36/00837* (2018.08)

(58) Field of Classification Search
CPC . H04W 36/34; H04W 36/0077; H04W 36/00; H04W 36/0005; H04W 36/00837; H04W 36/0085; H04W 36/0079; H04W 36/22; H04W 36/08; H04L 5/0051; H04L 56/003; H04L 56/0045; H04L 61/2053
See application file for complete search history.

(56) References Cited

U.S. PATENT DOCUMENTS

| | | | | |
|---|---|---|---|---|
| 5,327,575 A | * | 7/1994 | Menich | H04W 36/30 455/437 |
| 5,379,447 A | * | 1/1995 | Bonta | H04W 36/30 455/437 |
| 8,989,128 B2 | * | 3/2015 | Dinan | H04W 52/146 370/329 |
| 9,042,918 B2 | | 5/2015 | Teyeb et al. | |
| 9,264,961 B1 | * | 2/2016 | Shah | H04W 36/30 |
| 9,769,822 B2 | * | 9/2017 | Ahn | H04W 72/04 |
| 10,045,320 B2 | * | 8/2018 | Malladi | H04W 36/08 |
| 2013/0250925 A1 | * | 9/2013 | Lohr | H04W 72/0446 370/336 |
| 2014/0071856 A1 | | 3/2014 | Brisebois et al. | |
| 2014/0128095 A1 | * | 5/2014 | Finlow-Bates | H04W 4/021 455/456.1 |
| 2014/0148163 A1 | * | 5/2014 | Chin | H04W 36/14 455/436 |
| 2015/0271723 A1 | * | 9/2015 | Yang | H04W 36/08 455/436 |
| 2016/0165497 A1 | | 6/2016 | Tokunaga | |

(Continued)

*Primary Examiner* — Warner Wong
(74) *Attorney, Agent, or Firm* — Arent Fox, LLP

(57) ABSTRACT

An apparatus of wireless communication is configured to compute an timing advance (TA) estimate for a target cell. The TA estimate may be computed based on a measured TA for the serving cell and a time difference between a cell-specific reference signal (CRS) from the serving cell and a CRS from the target cell. The apparatus is also configured to determine whether an overshoot condition has occurred based on the timing advance estimate for the target cell. Furthermore, the apparatus is configured to refrain from triggering a handover to the target cell if an overshoot condition has occurred.

24 Claims, 11 Drawing Sheets

(56) References Cited

U.S. PATENT DOCUMENTS

| | | | |
|---|---|---|---|
| 2017/0019819 A1 | 1/2017 | Yang et al. | |
| 2017/0257787 A1 | 9/2017 | Regueira et al. | |
| 2018/0014230 A1* | 1/2018 | Dalsgaard | H04W 36/0077 |
| 2018/0035397 A1* | 2/2018 | Xie | H04W 56/00 |
| 2018/0139747 A1* | 5/2018 | Hosseini | H04W 56/001 |
| 2018/0176905 A1* | 6/2018 | Li | H04W 52/14 |
| 2018/0279193 A1* | 9/2018 | Park | H04W 36/08 |
| 2019/0053316 A1* | 2/2019 | Aiba | H04W 76/27 |
| 2019/0104452 A1* | 4/2019 | Park | H04W 36/00837 |
| 2019/0141590 A1* | 5/2019 | Li | H04W 36/023 |
| 2019/0174372 A1* | 6/2019 | Comstock | H04W 36/0077 |
| 2019/0349878 A1* | 11/2019 | Ashraf | H04L 1/0009 |

* cited by examiner

TIMING ADVANCE ASSISTED MEASUREMENT REPORT FOR IMPROVED HANDOVER PERFORMANCE

BACKGROUND

Technical Field

The present disclosure relates generally to communication systems, and more particularly, to a timing advance assisted measurement report for improved handover performance.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 4G LTE technology. These improvements may also be applicable to other multi-access technologies and the telecommunication standards that employ these technologies.

In wireless communication systems such as LTE, a user equipment (UE) reports the measured neighboring inter/intra-frequency cells following the measurement control message from the eUTRAN. For handovers, the measurement is normally based on RF metrics such as RSRP, or RSRQ, or both. When the UE reports a candidate cell with RSRP (or RSRQ, or both) meeting the target threshold, the network triggers a handover process to handover the UE to the target cell, presumably with a better RF condition. However, in some instances, a handover to a far-away cell may occur in which the RF condition is unstable leading to poor performance and an undesirable user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communication systems such as LTE, a user equipment (UE) reports measurements of neighboring inter/intra-frequency cells following the measurement control message from the eUTRAN. For handovers, the measurements are normally based on RF metrics such as reference signal received power (RSRP), or reference signals received quality (RSRQ), or both. When the UE reports a candidate cell with RSRP (or RSRQ, or both) meeting a target threshold (and better than the RSRP (or RSRQ or both) of the current serving cell), the network will trigger a handover process to handover the UE to the target cell, presumably with a better RF condition. In some instances, the handover process may result in having the UE handover to a poorer RF condition due to the condition of cell reference signal (CRS)-overshooting. In CRS-overshooting, the UE measures and reports a temporarily better RSRP/RSRQ of an inter/intra-frequency cell that is far away (e.g., not an immediate neighbor) due to temporary good propagation conditions of the signal from the cell, for example. Because of the higher RSRP/RSRQ, the UE's report may trigger a handover to the far-away cell. Unfortunately, the RF condition (e.g., RSRP/RSRQ) of the far away cell is often unstable, which may result in the UE immediately triggering a handover to a different cell and in some cases to the previous serving cell, or may result in call drop when the overshooting signal from the far away cell deteriorates too fast. Such a "ping-pong" type handover or call drop may result in poor performance and undesirable user experience (e.g., due to an interruption in data traffic).

To address the issues of handovers to cells with unstable RF conditions, aspects of the present disclosure are directed to timing advance assisted measurement reports for improved handover performance. By detecting the CRS-overshooting condition, UE will not immediately report measured RSRP (and/or RSRQ) of the corresponding far away cell, hence avoid the potential performance degradation due to ping-pong handover or call drops.

In an aspect of the disclosure, a method, a computer-readable medium, and an apparatus of wireless communication are provided. The apparatus includes a memory and at least one processor coupled to the memory. The processor(s) are configured to compute a timing advance (TA) estimate for a target cell. The processor(s) are also configured to determine whether an overshoot condition has occurred based on the timing advance estimate for the target cell. Furthermore, the processor(s) are configured to refrain from triggering a handover to the target cell if an overshoot condition has occurred.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
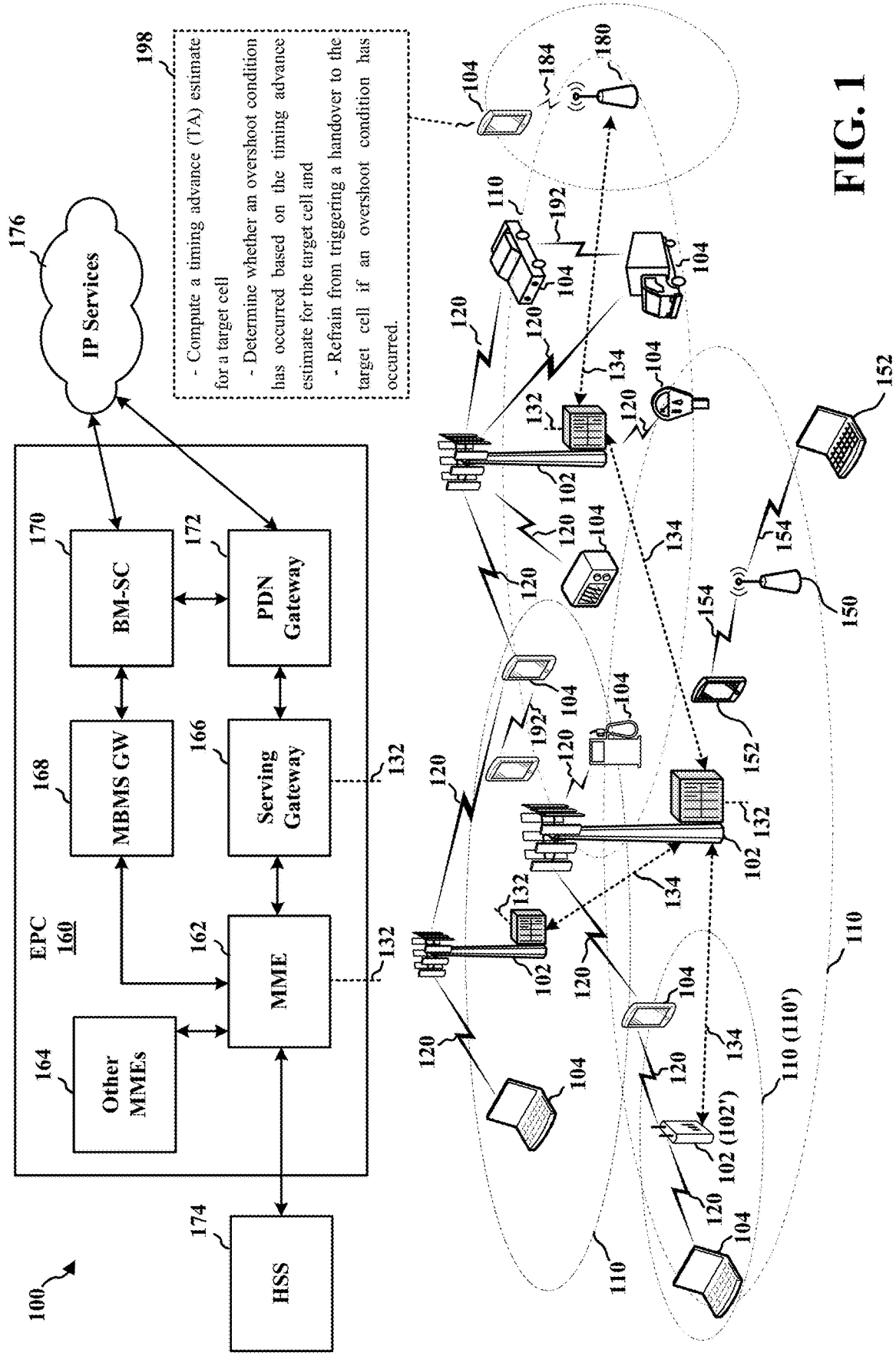
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, as will be apparent to those skilled in the art such concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine whether an overshoot condition has occurred based on the timing advance estimate for the target cell and refrain from triggering a handover if an overshoot condition has occurred (198). An overshoot condition may occur when the UE 104 measures and reports a good RSRP/RSRQ of an inter/intra-frequency cell that is far-away (e.g., not an immediate neighbor) due to temporary (e.g., for one measurement cycle) good propagation conditions of the signal from the far-away cell and as a result UE 104 may send a measurement report to trigger a handover to the far-away cell.

Figure 2A:
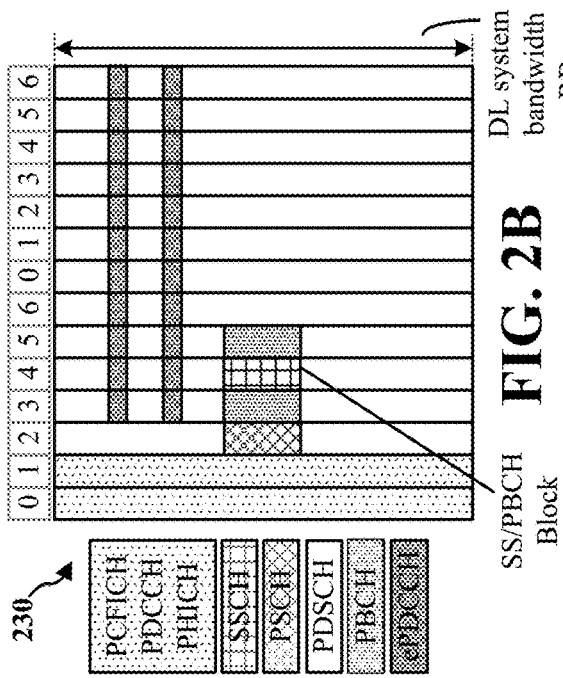
FIGS. 2A, 2B, 2C, and 2D are diagrams illustrating examples of a DL subframe, DL channels within the DL subframe, an UL subframe, and UL channels within the UL subframe, respectively, for a 5G/NR frame structure. The same DL and UL subframe structures (FIGS. 2A and 2C) are also used in 4G/LTE system.
Figure 2B:
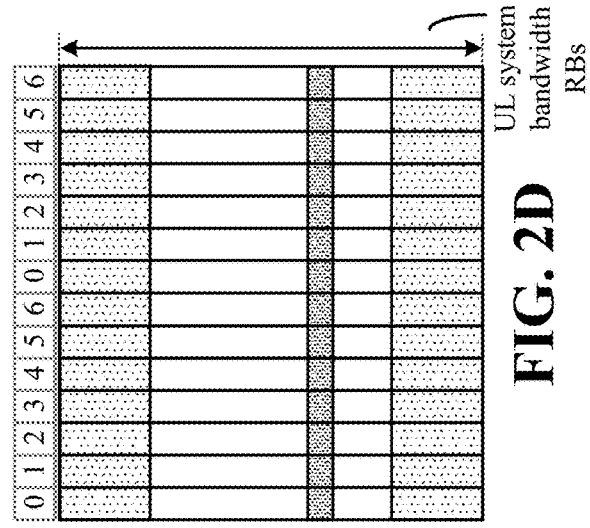
Figure 2C:
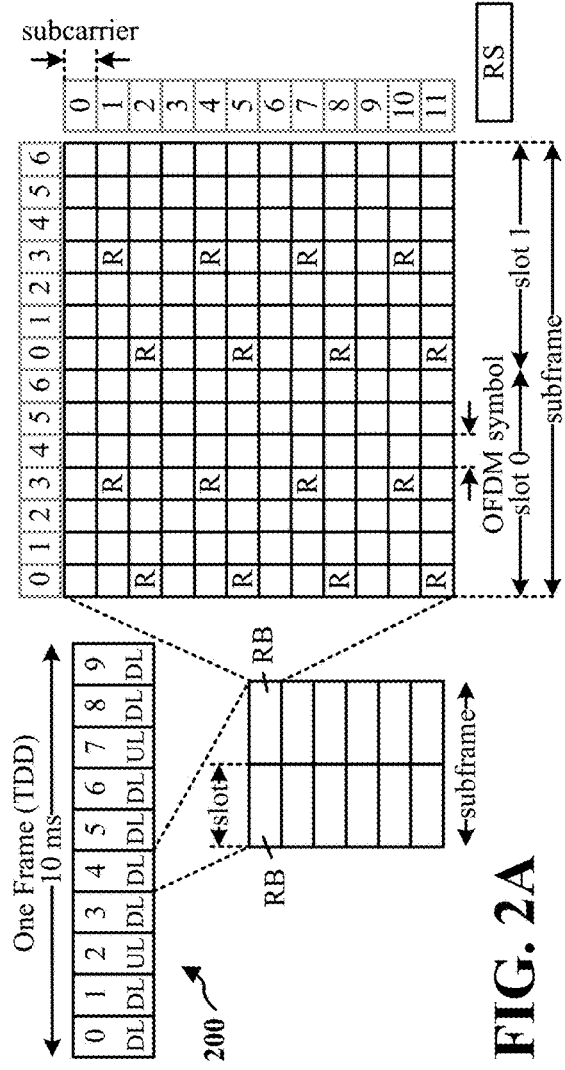
Figure 2D:
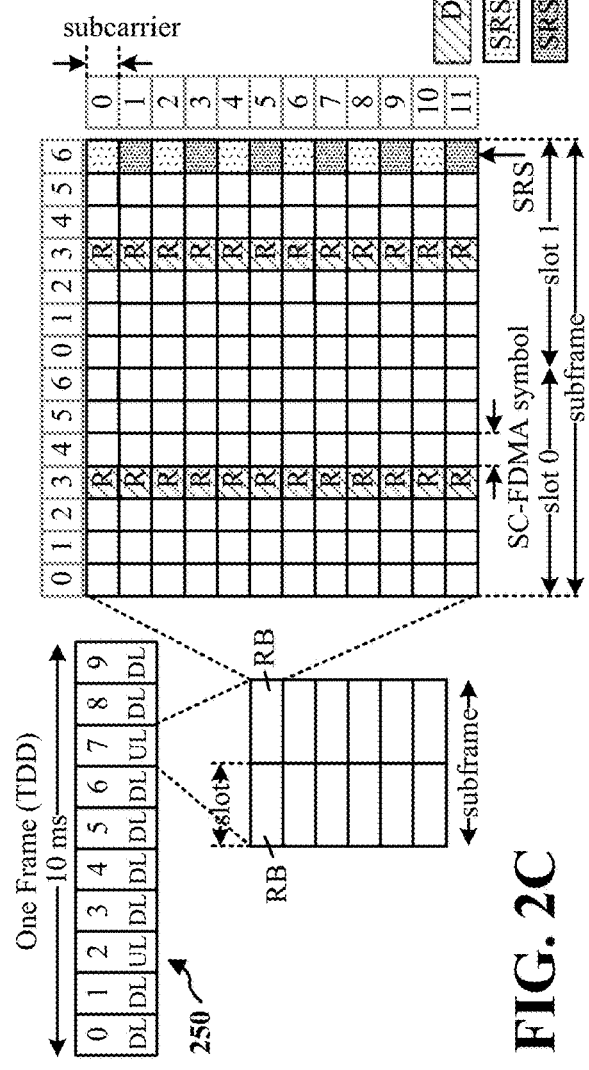

FIG. 2A is a diagram 200 illustrating an example of a DL subframe within a 5G/NR or 4G/LTE frame structure. FIG. 2B is a diagram 230 illustrating an example of channels within a DL subframe. FIG. 2C is a diagram 250 illustrating an example of an UL subframe within a 5G/NR or 4G/LTE frame structure. FIG. 2D is a diagram 280 illustrating an example of channels within an UL subframe. The 5G/NR or 4G/LTE frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR or 4G/LTE frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu * 15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
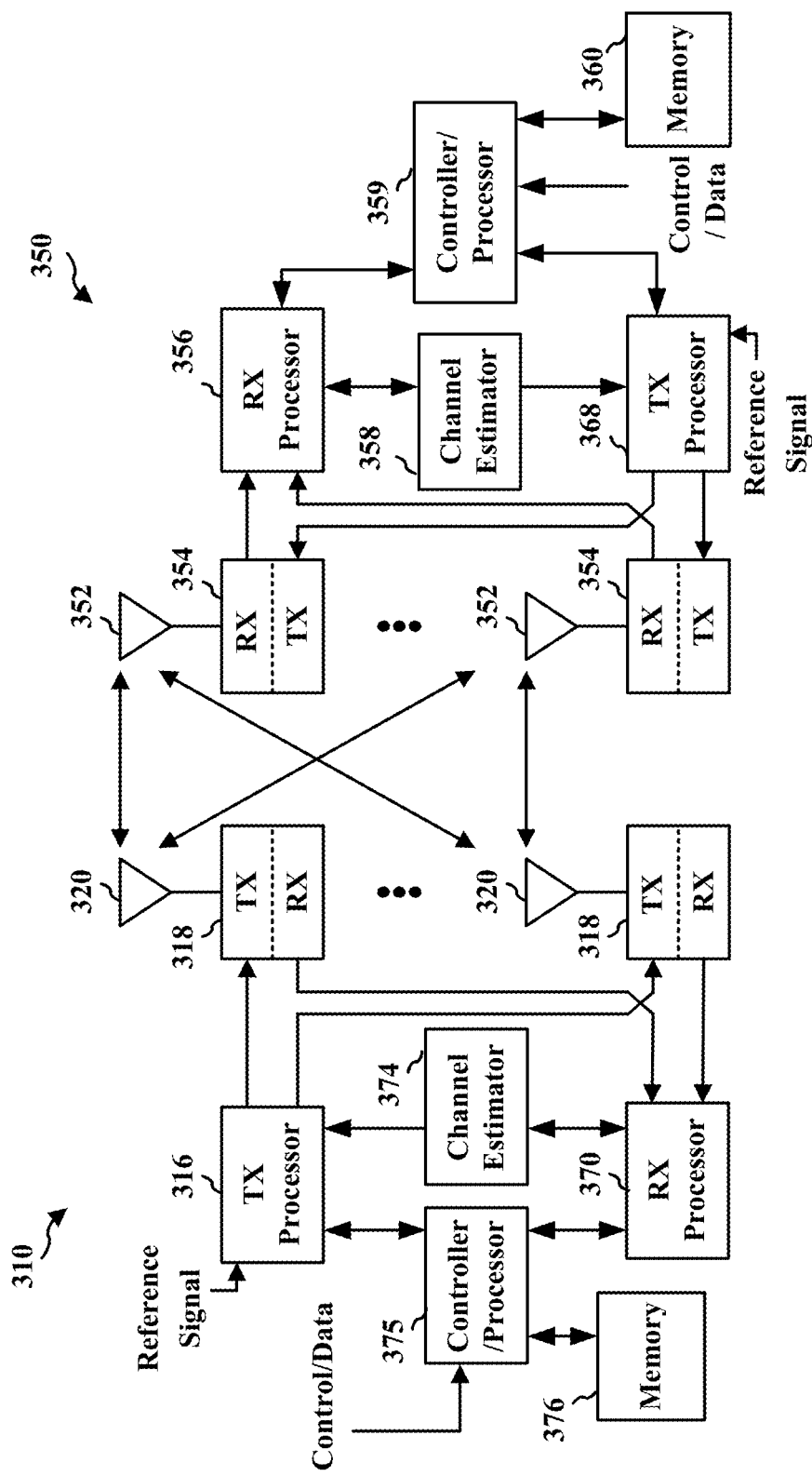
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the DL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As discussed above, when a UE determines that wireless communication performance with a serving cell has declined, the UE may trigger a handover procedure to switch to another cell that may provide better performance. However, the reasons for the decline in wireless performance (e.g., RSRP or RSRQ) may vary. For example, the decline may be because the UE has traveled to a location far away from the cell. On the other hand the decline may be because the UE has traveled to a location in which an obstacle (e.g., a tall building or other interference) is blocking the signal path between the UE and the serving base station. In this case, the decline may be temporary. In accordance with aspects of the present disclosure, a UE may compute a timing advance estimate for a target cell and may use such timing advance estimate in determining whether to initiate a handover to the target cell. In doing so, the UE may avoid an overshoot handover condition. That is, the UE may avoid a handover to a far-away cell (e.g., not an immediate neighbor) when a KPI for the far-away cell is temporarily better than the KPI for the serving cell.

Figure 4:
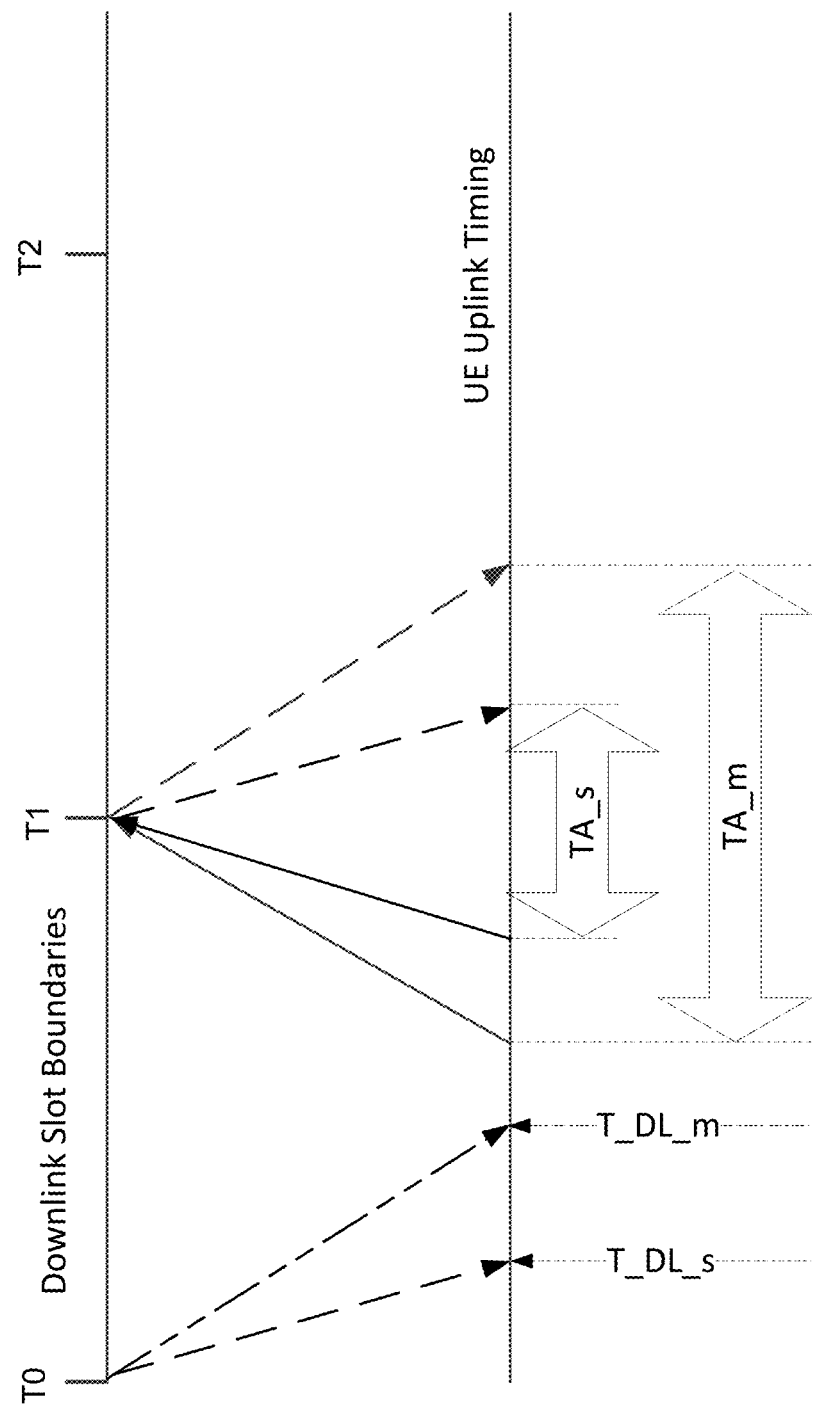
FIG. 4 is a diagram illustrating a target cell timing advance estimation in accordance with aspects of the present disclosure.

Referring to FIG. 4, a UE may receive a reference signal from a serving cell and a target cell. In one example, the network may comprise a TDD network (e.g., LTE-TDD) such that the serving cell and the target cell may be synchronized for UL/DL interference management. Of course, this is merely exemplary and the network could also be 5G NR or any other synchronized cellular wireless systems, for example. The slope of each received reference signal (relative to a downlink boundary (e.g., T0, T1, T2) may indicate propagation delay of each reference signal. The serving cell RS is closer in proximity to the UE, so the UE may receive the serving cell RS prior to receiving the target cell RS. The difference in arrival time of the reference signals may provide an indication of the relative distance between the UE and each of the cells. The UE may receive information from the serving cell which indicates the timing advance (TA) for the serving cell. The timing advance is a negative offset at the UE between the start of a received downlink subframe and a transmitted uplink subframe for synchronization at a base station, which is essentially the round-trip signal propagation delay between the serving cell base station and the UE. Using the serving cell TA and the timing difference between the reference cells, the UE may compute an estimate of the TA for the target cell. The estimate of the TA of the target cell may be computed as:

$$TA\_m = TA\_s + 2*(T\_DL\_m - T\_DL\_s) \quad (1)$$

where TA_s is the serving cell timing advance, T_DL_s is the UE observed downlink frame (or slot) boundary time of the serving cell which captures the DL RS signal propagation delay from the serving cell, T_DL_m is the UE observed downlink frame (or slot) boundary time of the measured target cell which captures the DL RS signal propagation delay from the target cell, and TA_m is the estimated timing advance of the measured target cell, which is the round-trip signal propagation delay between the target cell base station and the UE. Referring to FIG. 2A, the DL frame boundary time is the time corresponding to the beginning of the DL frame (e.g., the beginning of subframe #0). Where the timing advance is large the target cell may be an overshooting cell. In one example approach, to determine whether the measured cell is an overshooting cell, the UE may compare the computed timing advance estimate to a threshold. That is, the UE may determine that the target cell is an overshooting cell when the timing advance estimate is greater than a threshold (TA_m>Thld1) based on an absolute distance estimation. By way of example only and not limitations, for a 3GPP 4G/LTE macro network, the threshold (Thld1) may be set to 500 Ts, where Ts is a basic timing unit defined for 3GPP LTE systems and Ts.=1/(2048×15000) sec=1/30720000 sec (approximately 0.52 μsec). In an open space, the light or electronic magnetic wave (radio wave) may travel approximately 78 meter in 0.52 μsec. Hence, 500 Ts round-trip signal propagation delay is corresponding to a one-way distance of 500 Ts×(78/Ts)/2=19500 m, about 19.5 Km. Given a 4G/LTE macro cell radius of 0.5 Km~5 Km, the propagation distance (e.g., 19.5 Km) may indicate detection of an overshooting cell.

In a second example approach, the UE may determine whether a target cell is an overshooting cell by comparing the difference between an estimated timing advance for the target cell and the timing advance of the serving cell to a second threshold, Thld2. When the difference is greater than the threshold value (TA_m−TA_s>Thld2), the target cell may be deemed an overshooting cell. In this example, more stringent overshooting detection may be applied when the network is homogeneous or nearly homogeneous with similar cell radius for all of the cells in the network. In such a network, the UE may expect a similar signal propagation distance, comparing the distance from the serving cell base station to the UE and the target cell base station to the UE. That is, the difference TA_m−TA_s may be expected to be small. As such, a relatively large distance may indicate an overshooting cell detection. As an example, a value of Thld2 may be the propagation delay corresponding to an average cell radius in the network.

In a third example approach, the UE may determine whether a target cell is an overshooting cell by comparing the ratio of the estimated timing advance of the target cell and the timing advance of the serving cell to a third threshold ((TA_m)/(TA_s)>Thld3). In the third example, the overshoot may be determined by taking the cell size into account. For instance, the network may be heterogeneous, including cells of different sizes from small cells to macro cells. When the UE is being served by a small cell and performing a measurement on the neighboring macro cell, the resulting timing advance ratio (TA_m)/(TA_s) is the ratio of cell radius between the neighboring macro cell and the small serving cell. By setting the threshold Thld3 to a maximum ratio between the macro cell and small cell, the UE may detect overshooting macro cells once the timing advance ratio is above the threshold during the process of handover from a small cell to a macro cell.

In some aspects, the UE may apply a combination of the above approaches to determine whether a target cell is an overshooting cell or a valid candidate for handover/reselection. In one example, the estimated timing advance may be compared to an absolute threshold (e.g., TA_m>Thld1) such that only cells with radius Thld1 may be considered as valid candidates for handover/reselection. If there is only one candidate identified among all of the measure cells, then no further evaluation is performed. On the other hand, if additional candidates are identified as being within the absolute threshold radius, the UE may compare the ratio of the estimated timing advance of the each of the remaining candidate cells and the timing advance of the serving cell to a third threshold ((TA_m)/(TA_s)>Thld3). The candidate cells for which the ratio is above the third threshold may be deemed overshooting cells. The cells for which the ratio is below the third threshold may be given higher priority as potential handover/reselection candidates.

In some aspects, filtered timing advance measurements and estimates may be used in determining whether an overshoot condition has occurred. For example, the UE may apply a windowed average to each of the timing advance measurements. The windowed average may be the average of N consecutive measurements. In another example the UE may apply an infinite impulse response (IIR) filter to each of the timing advance measurements. For instance, the IIR filter may be given by:

$$\text{IIR filter } x(n) = a*x(n-1) + (1-a)*\text{measure}(n), \quad (2)$$

where a is a filter coefficient between 0 and 1, and x(n) is the filtered measurement after the nth measurement measure(n). Hence, after the nth measurement of target cell timing advance, TA_m(n), the filtered timing advance, TA_m_filtered, may be updated as, $$TA\_m\_\text{filtered}(n) = a*TA\_m\_\text{filtered}(n-1) + (1-a)*TA\_m(n)$$

Similarly, after the nth measurement of serving cell timing advance, TA_s(n), the filtered timing advance, TA_s_filtered, may be updated as, TA_s_filtered(*n*)=*a*\*TA_s_filtered(*n*−1)+(1−*a*)\*
TA_s(*n*)

Using filtered timing advance measurements rather than instantaneous measurements may allow systems to avoid misdetection due to multi-path variations when a reflection path suddenly becomes stronger, e.g., has a higher RSRP, RSRQ value.

When the UE determines that a candidate cell is an overshooting cell, the UE may refrain from or avoid triggering handover to the candidate cell. In the next measurement cycle, the UE may measure RF performance of the serving cell and neighboring cells to determine if handover is indicated. By delaying the measurement report, UE may reduce the likelihood of a handover to an overshooting cell because disparities in KPIs that are temporary and may have otherwise triggered a handover to the overshooting cell may have lapsed. In some aspects, while delaying the measurement report for overshooting conditions, the UE may also avoid running into radio link failure (RLF) due to unstable far cell radio conditions.

In some aspects, the UE may adjust the neighbor cell measurement by reducing a measurement frequency for the overshooting cell measurement and assigning candidates with lower TAs a higher priority/handover frequency. In some aspects, the UE may increase (low-pass) filtering for the overshooting cell measurement (overshooting RF signal often express large variations). Further, the UE may adjust the measurement priority and filtering to be proportional to the TA estimation. That is, the higher the TA, the lower the measurement priority (hence the increased triggering time) and increased filtering.

In some aspects, the network may be heterogeneous. That is, the network may include macro, micro, pico, and femto cells, each type of cell configured with different signal power setting and cell radius. When the UE is in a macro cell, the UE may employ approaches described above (e.g., the first approach, second approach or third approach) for overshooting cell detection. In some aspects, the UE may determine the type of cell that the UE is in based on network system information. For example, the UE may determine that the UE is in a macro cell, based on the cell reference signal power. For a macro cell, the network may set (and broadcast) the cell reference signal power to be 15 dBm to 21 dBm. On the other hand, for a micro cell or pico cell, the network may set (and broadcast) the cell reference signal power to be 5~8 dBm or lower. The UE may also detect the micro or pico cell based on cell ID provided the UE has the prior knowledge of the cell ID planning of the network.

When the UE is in a micro cell or a pico cell (e.g., determined based on cell reference power or cell system information), the overshooting detection may be modified. The UE may determine whether the target cell is a macro cell. For example, the UE may determine whether the target cell is a macro cell using the reference signal power which may be obtained by reading the target cell system information or may be provided by the network during measurement configuration. In another example, the UE may determine whether the target cell is a macro cell based on a cell reselection/handover measurement offset (e.g., obtained through reading the serving cell system info, network signaling during measurement configuration, or other techniques). A large cell reselection/handover measurement offset (larger than 5 dB) may be applied for a handover between the serving cell and target cell for the micro cell or pico cell to macro cell handover evaluation.

When the UE determines that the UE is in a micro cell or pico cell and is to handover to a target cell that is a macro cell, one or more of the following approaches may be applied to determine if the macro cell target is an overshooting cell.

(a) TA_m_filtered>Thld1,
(b) TA_m_filtered−N\*TA_s_filtered>Thld2,
(c) TA_m_filtered/(N\*TA_s_filtered)>Thld3, where N is a scaling factor applied to the micro/pico cell measurement. The scaling factor N may be determined based on the reference signal power difference between the neighbor cell and the serving cell. For instance, in one example, N may be given by:

*N*=(10^((Target macro cell reference signal power)−
(serving small cell reference signal power)+cell
handover measurement offset)/(*F*)), where the cell reference signal powers and cell handover/reselection measurement offset are either broadcasted in the cell system information message, or received by the UE via RRC signaling, and the factor F is a constant taking the value between 30 to 40.

Figure 5:
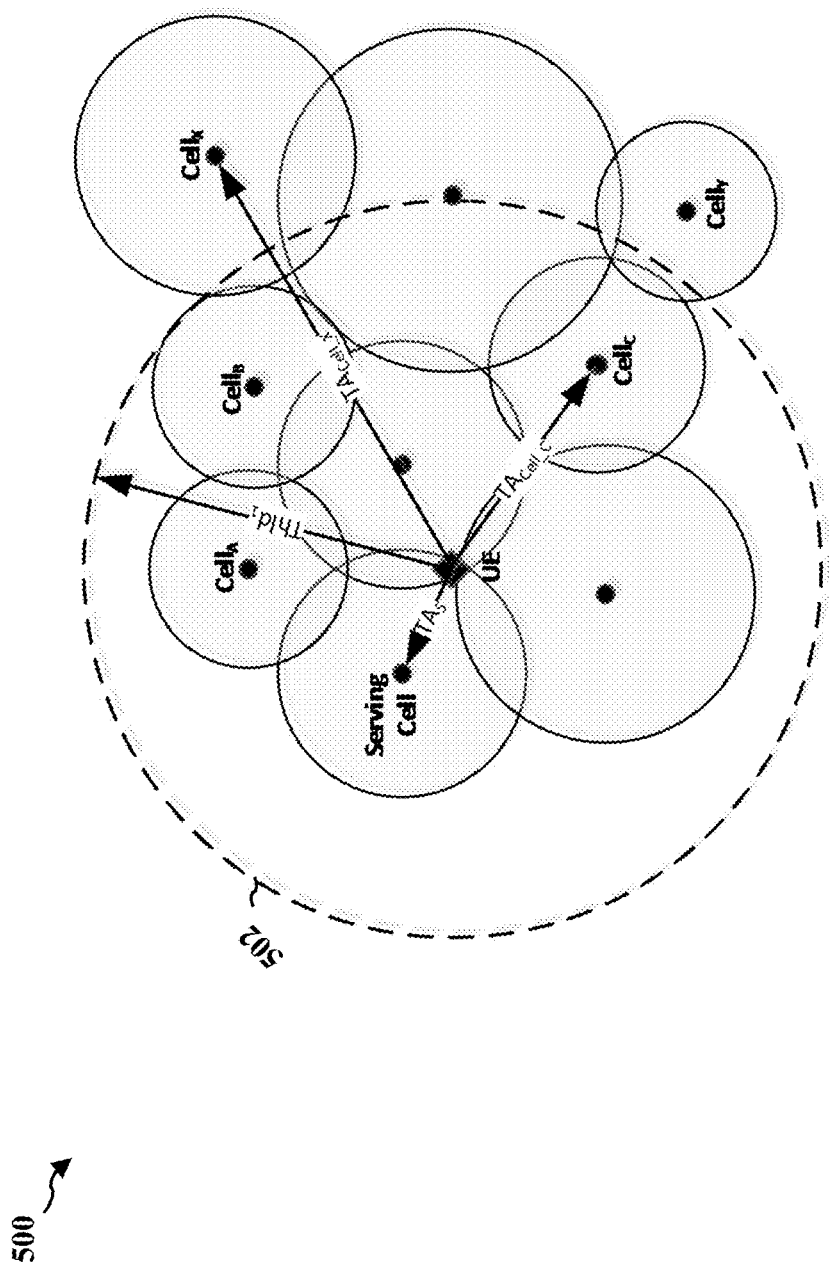
FIG. 5 is a diagram illustrating an example of overshoot detection in accordance with aspects of the present disclosure.

FIG. 5 is a diagram illustrating an example of overshoot detection using the absolute distance estimation (e.g., first approach), in accordance with aspects of the present disclosure. Referring to FIG. 5, a UE may be in communication with a serving cell in a region 500. When the RF performance of the serving cell falls below a threshold, the UE may determine that a handover may be desired. The UE may conduct a measurement of cells within region 500. Using equation 1 above, the UE may compute a TA estimate for each of the cells in the region 500. As illustrated in FIG. 5, a geographical boundary 502 is centered around a UE. The geographical boundary 502 may be defined by a TA threshold 1 (Thld$_1$). In other words, cells with TA estimates larger than Thld1 (e.g., outside of geographical boundary 502) may be considered as an overshooting cell. For example, Cell$_X$ and Cell$_Y$ are far-away cells that are outside of the geographical boundary 502. The TA estimates for Cell$_X$ and Cell$_Y$ are greater than the threshold (thld1)cell since the measured TA is larger than the threshold. Thus, the UE may determine that Cell$_X$ and Cell$_Y$ are overshooting cells. Accordingly, even if the key performance indicators (KPIs) (e.g., RSRP or RSRQ) for Cell$_X$ or Cell$_Y$ exceeds the KPIs for the other cells in the region 500, the UE may refrain from triggering a handover(reselection) to Cell$_X$ or Cell$_Y$.

On the other hand, Cell$_A$, Cell$_B$, and Cell$_C$ are within the geographic boundary 502. Applying the absolute distance estimation (e.g., first approach), the UE may determine that Cell$_A$, Cell$_B$, and Cell$_C$ are not overshooting cells. Thus, the UE may consider Cell$_A$, Cell$_B$, and Cell$_C$ to be candidate neighbor cells for handover.

In some aspects, Cell$_X$ and Cell$_Y$ may be included in a list of candidate neighbor cells with a lower priority for handover or reselection. Additionally, a priority designation may also be applied to the candidate cells within geographic boundary 502. For example, the priority designation may be determined based on proximity to the UE. In the example of FIG. 5, Cell$_A$ may be assigned a higher priority than Cell$_B$ or Cell$_C$ because Cell$_A$ is an immediate neighbor and is closer in proximity to the UE (e.g., has a lower TA estimate value) than Cell$_B$ or Cell$_C$.

Figure 6:
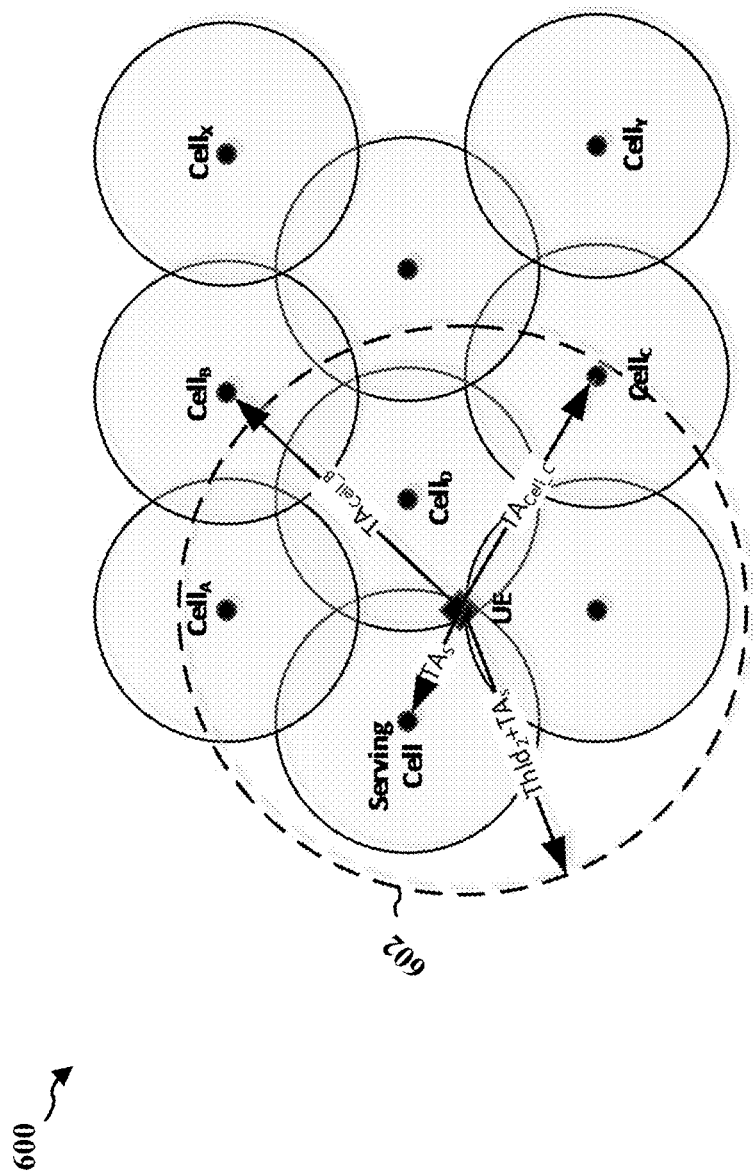
FIG. 6 is a diagram illustrating a second example of overshoot detection in accordance with aspects of the present disclosure.

FIG. 6 is a diagram illustrating a second example of overshoot detection in accordance with aspects of the present disclosure. Referring to FIG. 6, similar to FIG. 5, a UE may be in communication with a serving cell in a region 600. However, In FIG. 6, geographic boundary 602 may be adjusted by adding the serving cell measurement $TA_s$ to the TA threshold (Thld2). Adjusting the geographic boundary in this manner may allow for more accurate detection of overshooting cells in the network clusters in which the radius of the cells in the region 500 are similar. As such, the threshold may be set to a relatively smaller value. In a homogeneous network with similar cell radius for all the cells in the network, the UE expects similar signal propagation distances from the serving cell base station to the UE and from the target cell base station to the UE. That is, the difference TA_m−TA_s may be small or near the value of zero. Thus, a relatively large difference may indicate an overshooting cell detection. As an example, a value of Thld2 may be the propagation delay corresponding to an average cell radius in the network or even smaller. In contrast, the Thld1 illustrated in FIG. 5 may be the value of 5 to 10 times of the average cell radius in the network. In the example of FIG. 6, $Cell_B$, $Cell_X$ and $Cell_Y$ are outside of geographic boundary 602 based on the computed TA estimates for each cell and may be determined to be overshooting cells. On the other hand, $Cell_A$, $Cell_B$, and $Cell_D$ are within the geographic boundary 602 based on the computed TA estimate for each of $Cell_A$, $Cell_B$, and $Cell_D$ and $Cell_A$, $Cell_B$, and $Cell_D$ may be considered candidate neighbors cells.

Figure 7:
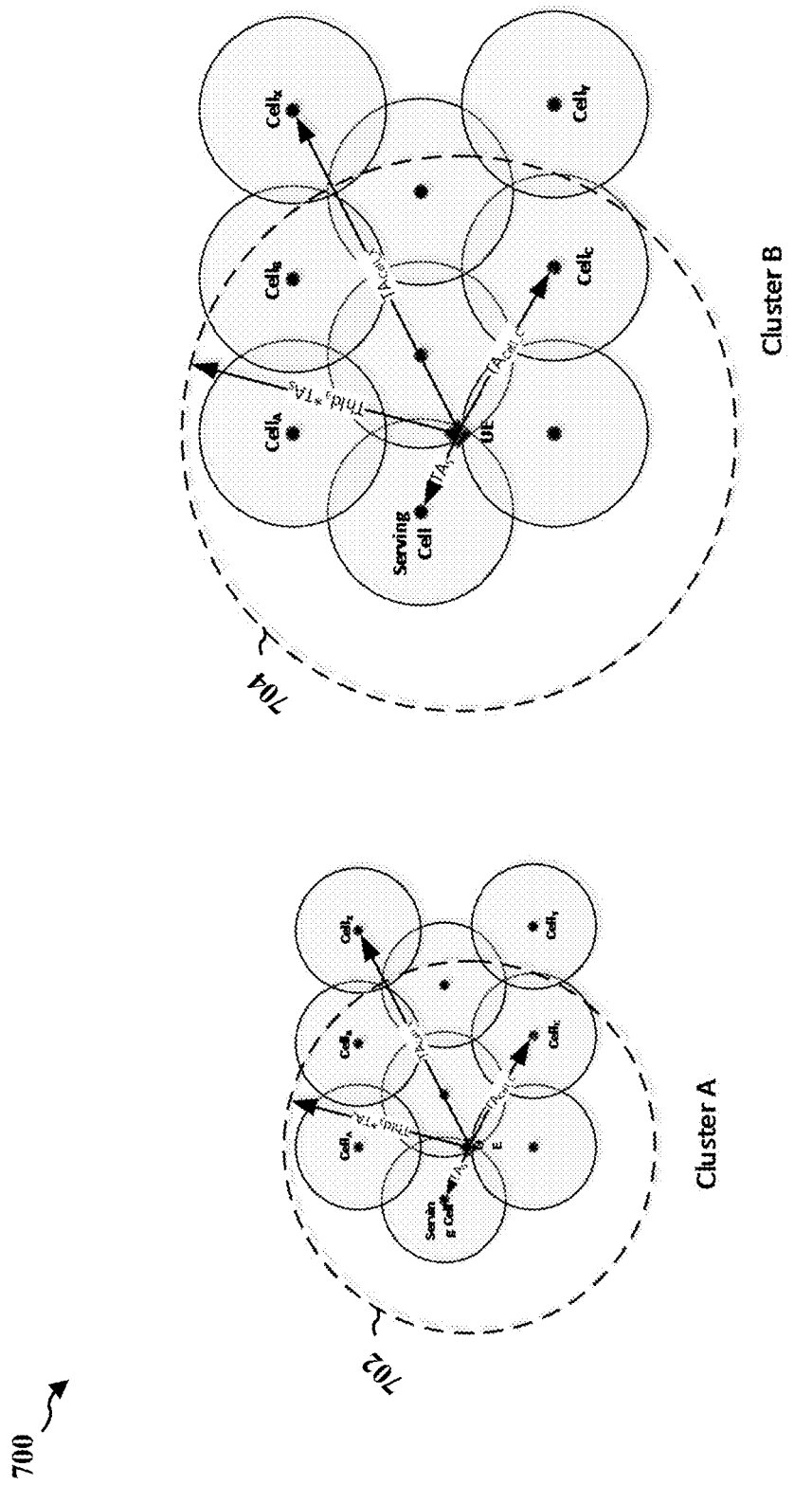
FIG. 7 is a diagram illustrating a third example of overshoot detection in accordance with aspects of the present disclosure.

FIG. 7 is a diagram illustrating a third example of overshoot detection in accordance with aspects of the present disclosure. In the example of FIG. 7, the threshold (Thld3) may be independent of the cell radius of the cluster and the actual geographical boundary for determining the overshooting cells may be dynamically scaled based on the serving cell radius (e.g., represented by TAs). As shown in FIG. 7, the cells in cluster A have a different cell radius than cells in cluster B. By applying the same threshold value Thld3, the geographic boundaries (702, 704) for cluster A and cluster B may be scaled accordingly.

Figure 8:
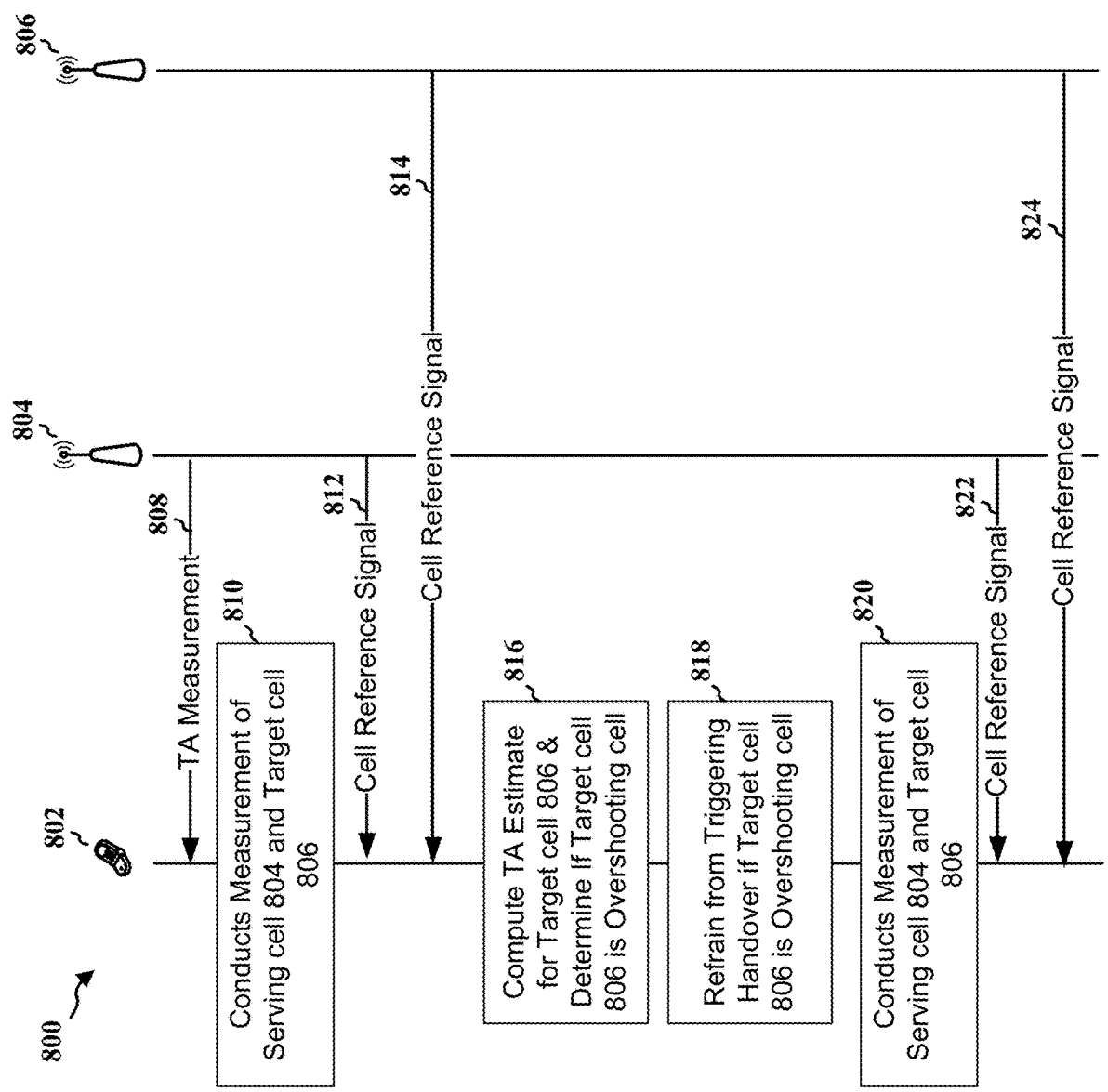
FIG. 8 is an exemplary call flow diagram illustrating overshoot detection in accordance with aspects of the present disclosure.

FIG. 8 is an exemplary call flow diagram 800 illustrating detection of an overshoot condition in accordance with aspects of the present disclosure. Referring to FIG. 8, UE 802 is in communication with a serving cell 804. At 808, the UE 802 receives a timing advance (TA) measurement from the serving cell 804. At 810, the UE conducts a measurement of the serving cell 804 and a neighboring cell such as target cell 806. At 812, the UE 802 receives a cell specific reference signal (CRS) from the serving cell 804. At 814, the UE 802 receives cell specific reference signal from the target cell 806. Using certain KPI (e.g., RSRP, RSRQ), the UE may determine if a handover is desirable (e.g., a neighbor cell has better RF performance). At 816, the UE 802 computes a TA estimate for the target cell 806 and determines whether the target cell 806 is an overshooting cell. The UE 802 may compute the TA estimate based on the received TA measurement for the serving cell and a timing difference between receiving the CRS from the serving cell and the CRS from the target cell according to Eq. 1. Using the computed TA estimate, the UE 802 may determine if the target cell 804 is an overshooting cell using the approaches discussed above with reference to FIGS. 4-7 (e.g., applying an absolute threshold distance). At 818, if the target cell 806 is an overshooting cell, the UE 802 may refrain from triggering a handover (e.g., by delaying the measurement report). At 820, the UE may conduct a further measurement of the serving cell 804 and the target cell 806. At 822, the UE 802 may again receive the CRS from the serving cell. At 824, the UE may receive the CRS from the target cell. The UE may again determine if a handover is desirable and the call flow may repeat. By refraining from triggering a handover to an overshooting cell and repeating the CRS measurements of the serving cell and target cell, the UE may reduce the likelihood of a handover to an overshooting cell with reduced RF performance (e.g., decreased data throughput or decreased VoLTE (voice over LTE) quality).

Figure 9:
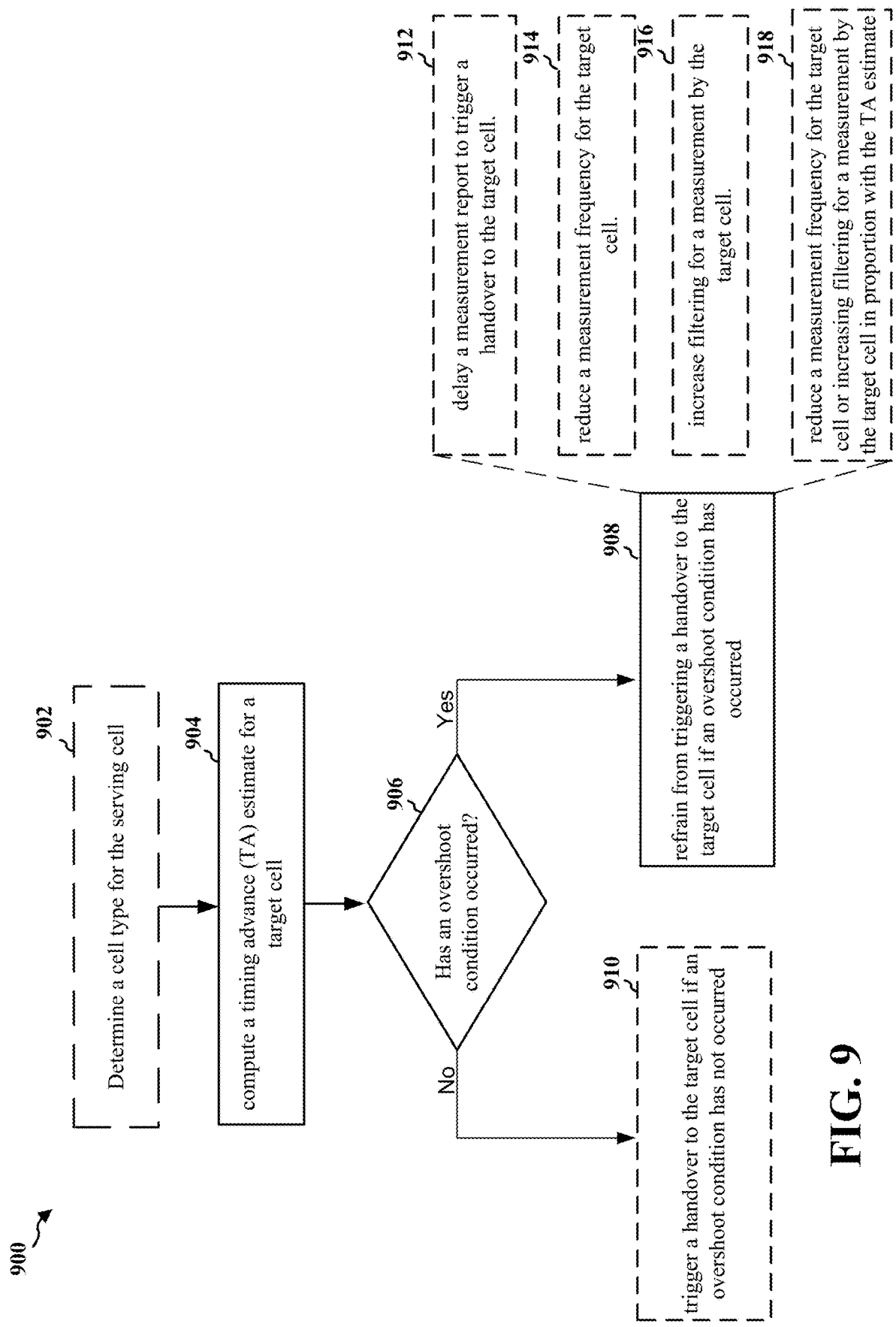
FIG. 9 is a flowchart of a method of wireless communication.

FIG. 9 is a flowchart 900 of a method of wireless communication. The method may be performed by a UE (e.g., the UE 104, the apparatus 1002/1002'). At 902, the UE may optionally determine a cell type for the serving cell. In some aspects, the UE may determine the type of cell that the UE is in based on network system information. For example, the UE may determine that the UE is in a macro cell, based on the cell reference signal power. For a macro cell, the network may set (and broadcast) the cell reference signal power to be 15 dBm to 21 dBm. On the other hand, for a micro cell or pico cell, the network may set (and broadcast) the cell reference signal power to be 5~8 dBm or lower.

At 904, the UE may compute a TA estimate for a target cell. The UE may receive information, such as the Timing Advance Command in 4G/LTE system, from the serving cell which indicates the TA for the serving cell. Using the serving cell TA and the timing difference between the reference signal received from the serving cell and the target cell(s), the UE may compute an estimate of the timing advance for the target cell(s). The estimate of the timing advance of the target cell may be computed as shown above in Eq. 1.

At 906, the UE may determine whether an overshoot condition has occurred. If an overshoot condition has occurred and the target cell is an overshooting cell, the UE may refrain from triggering a handover to the target cell (908). At 912, the UE may refrain from triggering the handover to the overshooting target cell by optionally delaying sending a measurement report to the serving cell to delay triggering the handover. For example, the UE may delay sending a measurement report for one or more measurement cycles (e.g., UE waits for a subsequent measurement. At 914, the UE may refrain from triggering the handover to the overshooting target cell by reducing a measurement frequency for the target cell.

At 916, the UE may refrain from triggering the handover to the overshooting target cell by increasing filtering for a measurement of the target cell. At 918, the UE may refrain from triggering the handover to the overshooting target cell by reducing a measurement frequency for the target cell or increasing filtering for a measurement of the target cell in proportion with the TA estimate for the target cell.

On the other hand, if an overshoot condition has not occurred, at 910, the UE may trigger a handover to the target cell. For example, the UE may send a measurement report indicating that the target cell has better KPI than the serving cell.

Figure 10:
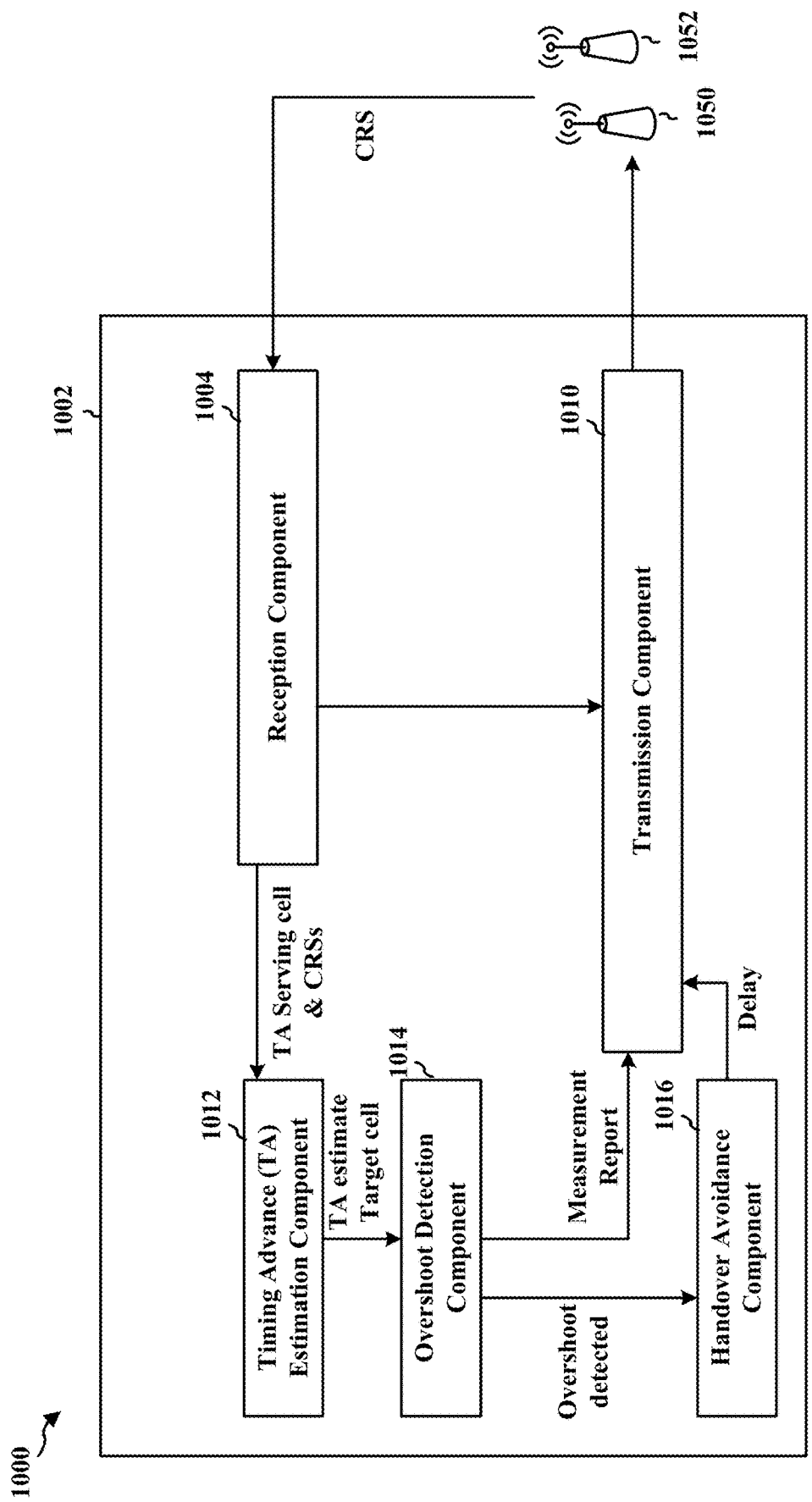
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus includes a TA estimation component 1012 that receives a TA measurement for serving cell 1050 and CRS for the serving cell 1050 and target cell 1052 via a reception component 1004. The TA estimation component 1012 computes a TA estimate for the target cell 1052. The apparatus also includes an overshoot detection component 1014 that determines whether the target cell is an overshooting cell and a handover avoidance component 1016 that refrains from triggering a handover to a target cell (e.g., delaying a measurement report) if the target cell is an overshooting cell. The apparatus further includes a transmission component 1010. If the target cell is determined not to be an overshooting cell, the transmission component may send a measurement report to the serving cell 1050 to trigger a handover to the target cell 1052.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
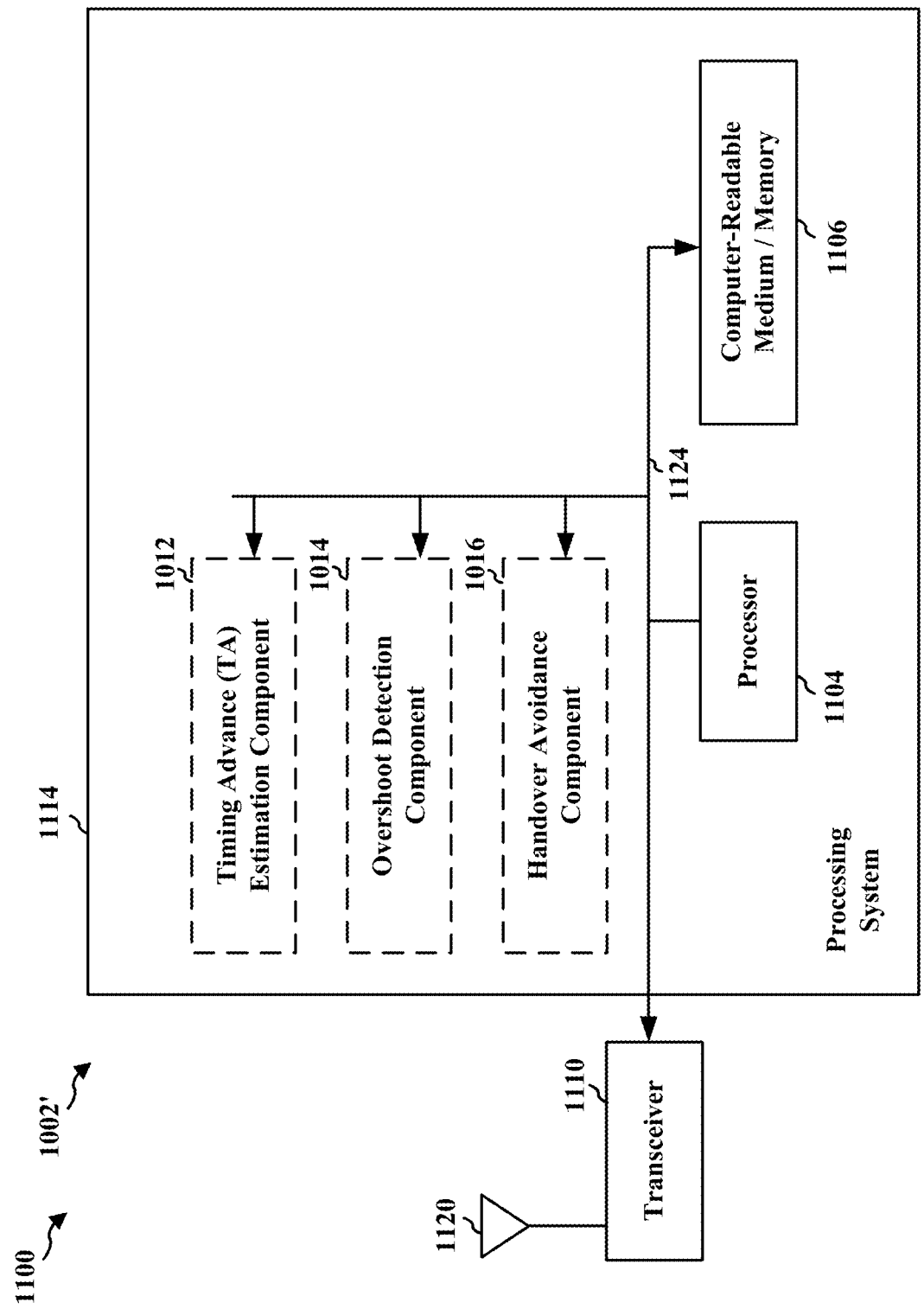
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1012, 1014, and 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for computing a timing advance (TA) estimate for a target cell. The apparatus 1002/1002' also includes means for determining whether an overshoot condition has occurred. The apparatus 1002/1002' further includes means for refraining from triggering a handover to the target cell if an overshoot condition has occurred. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    computing a timing advance (TA) estimate for a target cell;
    determining whether an overshoot condition has occurred based on the TA estimate for the target cell, wherein the determining whether the overshoot condition has occurred comprises at least one of comparing a difference between the TA estimate and a TA for a serving cell to a first threshold or comparing a ratio of the TA estimate and the TA to a second threshold, and wherein the overshoot condition has occurred if at least one of the difference exceeds the first threshold or the ratio exceeds the second threshold; and refraining from triggering a handover to the target cell if the overshoot condition has occurred.

2. The method of claim 1 wherein the determining further comprises comparing the TA estimate to a third threshold and the overshoot condition has occurred if the TA estimate exceeds the third threshold.

3. The method of claim 1, wherein, the computing comprises:
receiving the TA for the serving cell from a base station;
determining a reference signal timing difference between a downlink boundary time of the serving cell and a downlink boundary time of the target cell; and
calculating the TA estimate based on the TA for the serving cell and the reference signal timing difference.

4. The method of claim 1, wherein the refraining comprises delaying a measurement report to trigger the handover to the target cell.

5. The method of claim 1, wherein the refraining comprises reducing a measurement frequency for the target cell.

6. The method of claim 1, wherein the refraining comprises increasing filtering for a measurement of the target cell.

7. The method of claim 1, wherein the refraining comprises at least one of reducing a measurement frequency for the target cell or increasing filtering for a measurement of the target cell in proportion with the TA estimate.

8. An apparatus of wireless communication, comprising:
a memory; and
at least one processor coupled to the memory and configured to:
compute a timing advance (TA) estimate for a target cell;
determine whether an overshoot condition has occurred based on the TA estimate for the target cell, wherein the determination of whether the overshoot condition has occurred comprises at least one of comparison of a difference between the TA estimate and a TA for a serving cell to a first threshold or comparison of a ratio of the TA estimate and the TA to a second threshold, and wherein the overshoot condition has occurred if at least one of the difference exceeds the first threshold or the ratio exceeds the second threshold; and
refrain from triggering a handover to the target cell if the overshoot condition has occurred.

9. The apparatus of claim 8, wherein the at least one processor is further configured to compare the TA estimate to a third threshold and the overshoot condition has occurred if the TA estimate exceeds the third threshold.

10. The apparatus of claim 8, wherein, the at least one processor is further configured to:
receive the TA for the serving cell from a base station;
determine a reference signal timing difference between a downlink boundary time of the serving cell and a downlink boundary time of the target cell; and
calculate the TA estimate based on the TA for the serving cell and the reference signal timing difference.

11. The apparatus of claim 8, wherein to refrain from triggering the handover to the target cell if the overshoot condition has occurred, the at least one processor is configured to delay a measurement report to trigger the handover to the target cell.

12. The apparatus of claim 8, wherein to refrain from triggering the handover to the target cell if the overshoot condition has occurred, the at least one processor is configured to reduce a measurement frequency for the target cell.

13. The apparatus of claim 8, wherein to refrain from triggering the handover to the target cell if the overshoot condition has occurred, the at least one processor is configured to increase filtering for a measurement of the target cell.

14. The apparatus of claim 8, wherein to refrain from triggering the handover to the target cell if the overshoot condition has occurred, the at least one processor is configured to at least one of reduce a measurement frequency for the target cell or increase filtering for a measurement of the target cell in proportion with the TA estimate.

15. An apparatus of wireless communication, comprising:
means for computing a timing advance (TA) estimate for a target cell;
means for determining whether an overshoot condition has occurred based on the TA estimate for the target cell, wherein the means for determining whether the overshoot condition has occurred is configured to at least one of compare a difference between the TA estimate and a TA for a serving cell to a first threshold or compare a ratio of the TA estimate and the TA to a second threshold, and wherein the means for determining whether the overshoot condition has occurred is further configured to determine the overshoot condition has occurred if at least one of the difference exceeds the first threshold or the ratio exceeds the second threshold; and
means for refraining from triggering a handover to the target cell if the overshoot condition has occurred.

16. The apparatus of claim 15, wherein the means for determining whether the overshoot condition has occurred is further configured to compare the TA estimate to a third threshold, and the means for determining whether the overshoot condition has occurred is further configured to determine that the overshoot condition has occurred if the TA estimate exceeds the third threshold.

17. The apparatus of claim 15, further comprising:
means for receiving the TA for the serving cell from a base station;
means for determining a reference signal timing difference between a downlink boundary time of the serving cell and a downlink boundary time of the target cell; and
means for calculating the TA estimate based on the TA for the serving cell and the reference signal timing difference.

18. The apparatus of claim 15, wherein the means for refraining from triggering the handover to the target cell is configured to delay a measurement report to trigger the handover to the target cell if the overshoot condition has occurred.

19. The apparatus of claim 15, wherein the means for refraining from triggering the handover to the target cell is configured to reduce a measurement frequency for the target cell if the overshoot condition has occurred.

20. The apparatus of claim 15, wherein the means for refraining from triggering the handover to the target cell is configured to increased filtering for a measurement of the target cell if the overshoot condition has occurred.

21. The apparatus of claim 15, wherein the means for refraining from triggering the handover to the target cell is configured to at least one of reduce a measurement frequency for the target cell if the overshoot condition has occurred or increase filtering for a measurement of the target cell in proportion with the TA estimate if the overshoot condition has occurred.

22. A non-transitory, computer readable medium storing executable code for wireless communication, comprising code to:
  compute a timing advance (TA) estimate for a target cell;
  determine whether an overshoot condition has occurred based on the TA estimate for the target cell, wherein the determination of whether the overshoot condition has occurred comprises at least one of comparison of a difference between the TA estimate and a TA for a serving cell to a first threshold or comparison of a ratio of the TA estimate and the TA to a second threshold, and wherein the overshoot condition has occurred if at least one of the difference exceeds the first threshold or the ratio exceeds the second threshold; and
  refrain from triggering a handover to the target cell if the overshoot condition has occurred.

23. The non-transitory, computer readable medium of claim 22, further comprising code to:
  receive a TA for a serving cell from a base station;
  determine a reference signal timing difference between a downlink boundary time of the serving cell and a downlink boundary time of the target cell; and
  calculate the TA estimate based on the TA for the serving cell and the reference signal timing difference.

24. The non-transitory, computer readable medium of claim 22, wherein the code to refrain from triggering the handover to the target cell if the overshoot condition has occurred comprises code to at least one of:
  delay a measurement report to trigger the handover to the target cell;
  reduce a measurement frequency for the target cell;
  increase filtering for a measurement of the target cell;
  reduce the measurement frequency for the target cell in proportion with the TA estimate; or
  increase filtering for the measurement of the target cell in proportion with the TA estimate.

* * * * *